(12) United States Patent
Brewer

(10) Patent No.: US 10,569,641 B1
(45) Date of Patent: Feb. 25, 2020

(54) MULTI-PASSENGER ELECTRIC TRANSPORTER

(71) Applicant: Anthony L. Brewer, Indianapolis, IN (US)

(72) Inventor: Anthony L. Brewer, Indianapolis, IN (US)

( * ) Notice: Subject to any disclaimer, the term of this patent is extended or adjusted under 35 U.S.C. 154(b) by 0 days.

(21) Appl. No.: 16/056,825

(22) Filed: Aug. 7, 2018

(51) Int. Cl.
| | |
|---|---|
| *B60K 1/00* | (2006.01) |
| *B60K 7/00* | (2006.01) |
| *B60K 1/04* | (2019.01) |
| *H02J 7/35* | (2006.01) |
| *B60L 50/52* | (2019.01) |
| *B60L 53/00* | (2019.01) |
| *B62D 1/16* | (2006.01) |
| *B62D 3/02* | (2006.01) |
| *A61G 5/04* | (2013.01) |

(52) U.S. Cl.
CPC .............. *B60K 7/0007* (2013.01); *B60K 1/04* (2013.01); *B60L 50/52* (2019.02); *B60L 53/00* (2019.02); *H02J 7/35* (2013.01); *A61G 5/045* (2013.01); *B60K 2001/0416* (2013.01); *B60L 2200/34* (2013.01); *B62D 1/16* (2013.01); *B62D 3/02* (2013.01)

(58) Field of Classification Search
CPC .. A61G 5/045; A61G 5/00; A61G 5/04; H02J 7/35; B60K 7/0007; B60K 7/00; B60K 1/04; B60K 1/00; B60K 1/02; B60K 2001/0416; B60L 50/52; B60L 50/50; B60L 2200/34; B60L 2200/22; B60L 2200/18; B60L 2200/24
See application file for complete search history.

(56) References Cited

U.S. PATENT DOCUMENTS

| | | | | |
|---|---|---|---|---|
| 3,616,872 A | * | 11/1971 | Taylor | B62D 23/005 180/55 |
| 3,983,952 A | * | 10/1976 | McKee | B60K 1/04 280/778 |
| 4,902,029 A | | 2/1990 | Gain et al. | |
| 5,058,016 A | * | 10/1991 | Davidovitch | B60L 8/003 701/22 |
| 5,921,338 A | * | 7/1999 | Edmondson | B60G 21/045 180/65.51 |
| 5,923,096 A | * | 7/1999 | Manak | B60L 50/52 307/10.1 |
| 6,015,022 A | * | 1/2000 | Thuliez | B62D 21/04 180/210 |
| 6,059,058 A | * | 5/2000 | Dower | B60K 1/04 180/65.22 |

(Continued)

*Primary Examiner* — James M Dolak

(74) *Attorney, Agent, or Firm* — Sanchelima & Associates, P.A.; Christian Sanchelima; Jesus Sanchelima

(57) ABSTRACT

The present invention is a self-propelled transporter with motorized drive wheels which is particularly designed to transport patients from one location to another. The transporter includes an undercarriage having a first set of wheels pivotally connected at a bottom and proximal to a front of the undercarriage, and a second set of wheels non-pivotally connected at a bottom and proximal to a rear of the undercarriage. The transporter further includes one or more electric motors coupled to the second set of wheels. The transporter includes a base supported on the undercarriage. The transporter further includes two or more seats installed on the base to allow for patients to sit thereon.

13 Claims, 3 Drawing Sheets

(56) References Cited

U.S. PATENT DOCUMENTS

Figure 1:
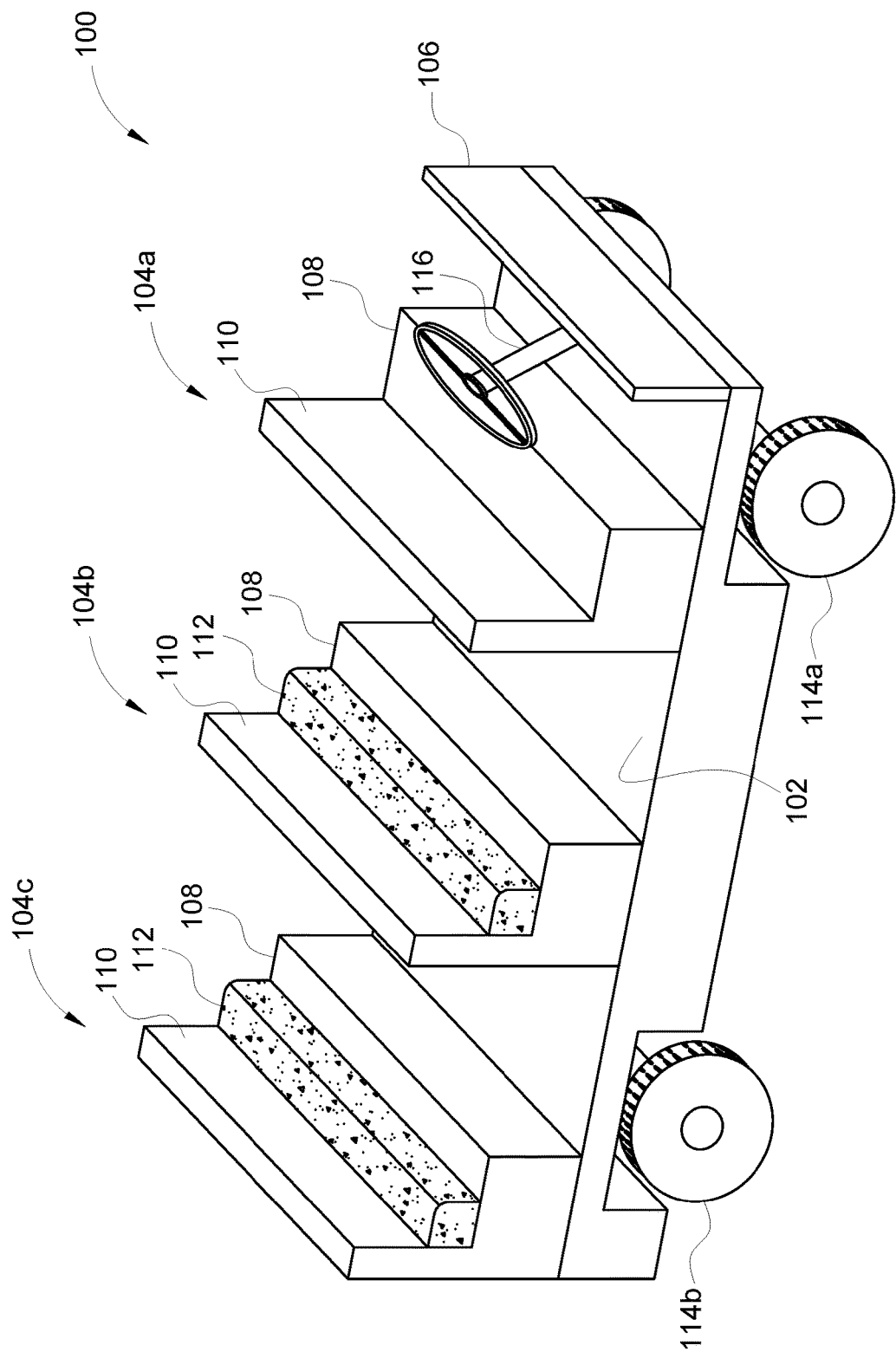

| | | | | |
|---|---|---|---|---|
| 7,243,746 | B1* | 7/2007 | Vasant | B60L 53/00 |
| | | | | 180/6.5 |
| 8,104,554 | B2* | 1/2012 | Graham | A61G 5/045 |
| | | | | 180/65.1 |
| 8,640,796 | B2* | 2/2014 | Wilson | B60L 7/24 |
| | | | | 180/2.2 |
| 9,649,923 | B2* | 5/2017 | Perlo | B60K 1/00 |
| 9,994,260 | B2* | 6/2018 | Ito | B60G 3/06 |
| 10,160,349 | B2* | 12/2018 | Larouche | B62D 47/00 |
| 10,358,023 | B2* | 7/2019 | Hegewald | B60L 50/66 |
| 10,369,874 | B2* | 8/2019 | Oko | B60K 6/485 |
| 10,384,704 | B2* | 8/2019 | Fielder | B62D 1/12 |
| 10,434,861 | B2* | 10/2019 | Narisawa | B60K 1/04 |
| 2015/0196439 | A1* | 7/2015 | Osipov | A61G 5/065 |
| | | | | 280/5.28 |
| 2016/0207418 | A1* | 7/2016 | Bergstrom | B60L 50/64 |

\* cited by examiner

MULTI-PASSENGER ELECTRIC TRANSPORTER

II. BACKGROUND OF THE INVENTION

1. Field of the Invention

The present disclosure generally relates to transporter for transporting passengers, and more particularly, relates to a self-propelled, motorized and steerable electric wheelchair for transporting multiple passengers at one go.

2. Description of the Related Art

Handicapped and disabled persons are of necessity restricted to the use of wheelchairs for movement from place to place. However, such persons frequently wish to travel, for example, or may be required to be moved in or out of an institution such as a hospital, nursing home, or the like. Usually this requires a caretaker to manually push the wheelchair. Some drivable self-propelled wheelchairs have been known in the prior-art. Such self-propelled wheelchairs are structured with only one seat for a single sitting occupant. Wheelchair occupants often travel with either a caregiver or friend who must walk alongside the wheelchair. The walker (caregiver or friend) can get tired or become physically stressed due to the rate of travel or distance traveled, which is a problem.

Applicant believes that a related reference corresponds to U.S. Pat. No. 4,902,029A (hereinafter referred to as '029 patent) discloses a wheelchair and carrier for a disabled person having a seat and back, and wheels, a carrier integrally formed with the wheelchair extending rearwardly at the back of the seat and back, support wheels on the carrier for supporting the weight of items on the carrier, and, handles associated with the carrier so that a person can push the wheelchair and carrier as a single unit. The wheelchair of the '029 patent only provides space for transporting luggage along with the passenger, and still does not solve the problem of facilitating the transportation of the walker along with the handicapped person or the like. Moreover, the disclosed wheelchair of the '029 patent does not provide any self-propelling means for providing movement thereof without the need of manual effort.

Documents describing the closest subject matter provide for a number of more or less complicated features that fail to solve the problems described above in an efficient and economical way. None of the documents suggest the novel features of the present invention.

III. SUMMARY OF THE INVENTION

It is one of the main objectives of the present invention to provide a self-propelled transporter with motorized drive wheels.

It is another objective of the present invention to provide a transporter which can accommodate multiple passengers.

It is yet another objective of the present invention to provide a transporter which is compact, comfortable and optionally self-driven.

Further objects of the invention will be brought out in the following part of the specification, wherein detailed description is for the purpose of fully disclosing the invention without placing any limitations thereon.

IV. BRIEF DESCRIPTION OF THE DRAWINGS

Figure 2:
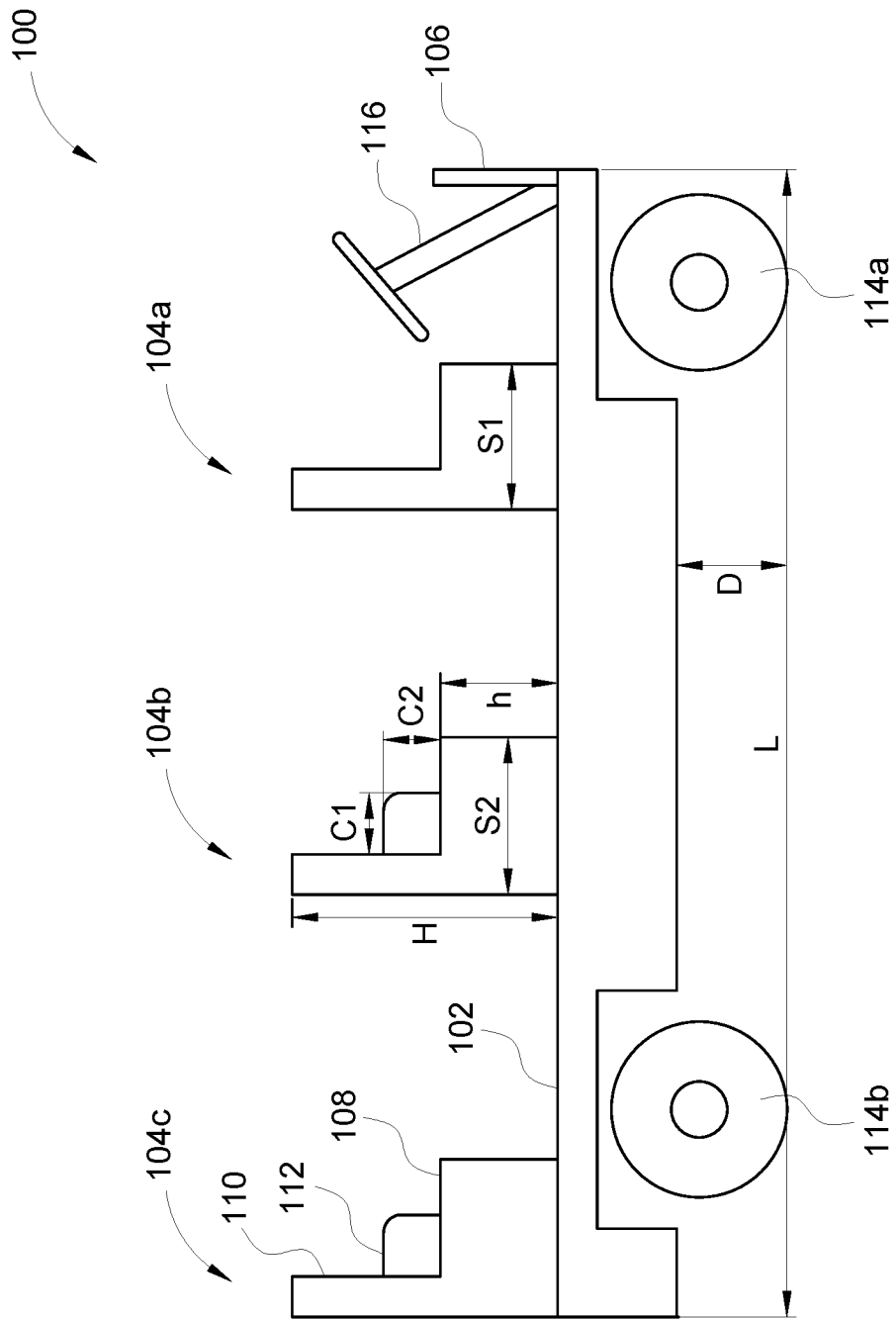
Figure 3:
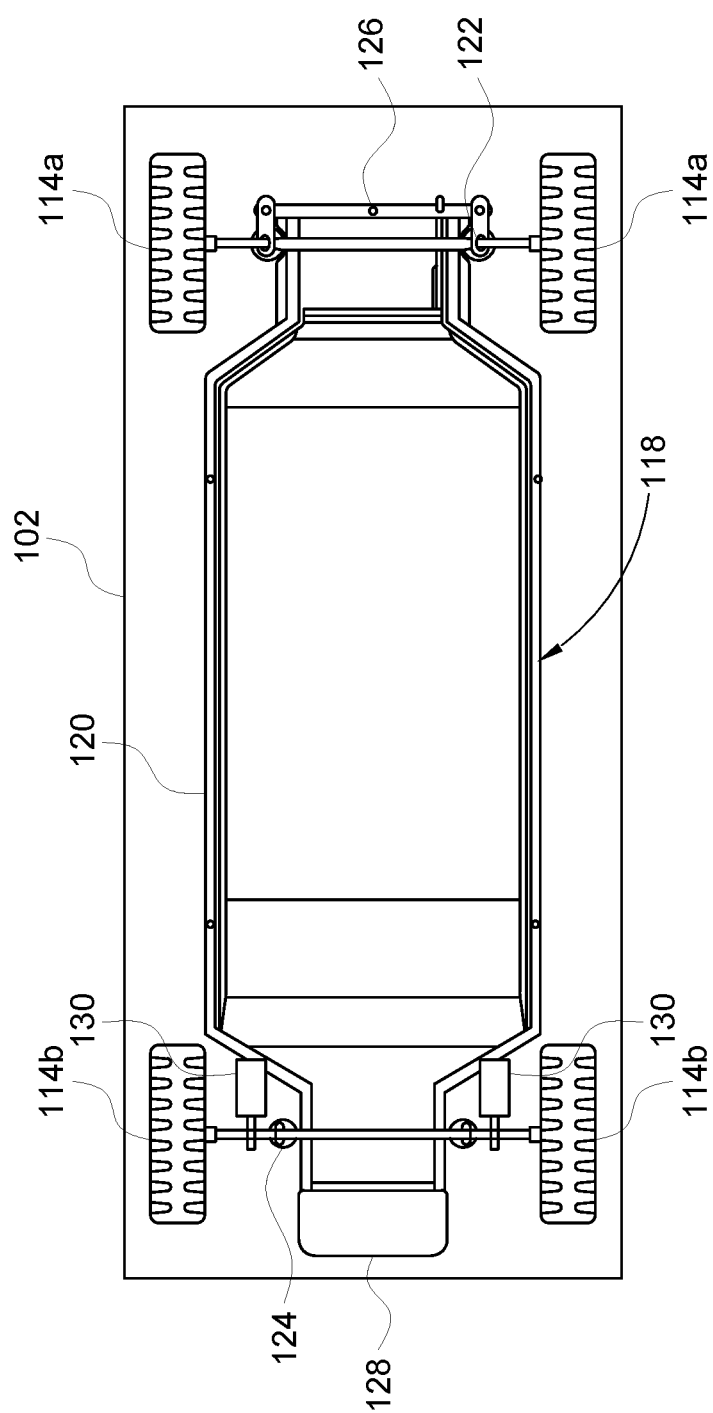

With the above and other related objects in view, the invention consists in the details of construction and combination of parts as will be more fully understood from the following description, when read in conjunction with the accompanying drawings in which:

FIG. 1 illustrates a diagrammatic perspective view of a transporter 100 with seats 104 for multiple passengers, in accordance with one or more embodiments of the present invention;

FIG. 2 illustrates a diagrammatic side planar view of a transporter 100 with seats 104 for multiple passengers, in accordance with one or more embodiments of the present invention; and FIG. 3 illustrates a diagrammatic bottom planar view of the transporter 100 showing driving mechanism involving electric motors 130 therefor, in accordance with one or more embodiments of the present invention.

V. DETAILED DESCRIPTION OF THE EMBODIMENTS OF THE INVENTION

Illustrative embodiments of the present invention are described below. The following explanation provides specific details for a thorough understanding of and enabling description for these embodiments. One skilled in the art will understand that the invention may be practiced without such details. In some instances, well-known structures, processes and functions have not been shown or described in detail to avoid unnecessarily obscuring the description of the embodiments.

It shall be noted that unless the context clearly requires otherwise, throughout the description, the words "comprise," "comprising," "include," "including," and the like are to be construed in an inclusive sense as opposed to an exclusive or exhaustive sense; that is to say, in the sense of "including, but not limited to." Words using the singular or plural number also include the plural or singular number, respectively while adhering to the concepts of the present invention. Furthermore, references to "one embodiment" and "an embodiment" are not intended to be interpreted as excluding the existence of additional embodiments that also incorporate the recited features.

Referring to the drawings, FIG. 1 illustrate a diagrammatic view of a transporter (referred by the numeral 100), in accordance with one or more embodiments of the present invention. The transporter 100 of the present invention is a self-propelled vehicle with motorized driving wheels. The transporter 100 is particularly designed to accommodate passengers, such as handicapped people or patients, along with their caretakers, like a family member or a friend accompanying them, therein. However, it may be understood that the transporter 100 in a similar fashion can also be employed for other purposes, like transporting of employees in a large office space, transporting of customers in a large shopping complex and the like. In some examples, the transporter 100 may also be used for moving goods from one location to another. The transporter 100 is adapted to be driven on various types of terrains, from hard pavements, roads, home gardens, sandy surfaces, and the like.

In the illustrated embodiment of FIG. 1, the transporter 100 is shown to include a base 102 with three seats (collectively referred by the numeral 104 herein), namely a front seat 104a, a middle seat 104b and a rear seat 104c, installed thereon. The seats 104 may be arranged in line on the base 102. It may be understood that the transporter 100 may have more or less number of seats 104 based on the requirement and application thereof, without affecting the scope of the present disclosure. The base 102 may generally have a rectangular shape with width small enough to be able to pass through entrances, like doors and the like; and comparatively larger length to accommodate multiple seats 104. The seats 104 may generally extend along the entire width of the base 102. The seats 104 have been shown to be opened at the peripheral ends of the width of the base 102; however, in other examples, the seats 104 may be closed at peripheral ends by means of armrests or the like. In some examples, the transporter 100 may further include an upstanding peripheral wall 106 of suitable height and located at a front portion of the base 102, based on the application of the transporter 100. The wall 106 to provide support and prevent possible risk of any passenger sitting on the front seat 104a to fall off with the momentum of the transporter 100 during movement thereof (as will be discussed in the subsequent paragraphs).

As illustrated in FIG. 1, the seats 104 generally provide a supporting bed 108 with an upstanding supporting back 110. Herein, the supporting back 110 is shown to be rigidly fixed to the supporting bed 108, and further arranged substantially orthogonally to the supporting bed 108. However, it may be contemplated that the seat 104 may be of any configuration known in the art, and its design and shape shall not be construed as limiting to the present disclosure. In one or more examples, the seats 104 may be provided with cushions 112 for comfort of the users sitting thereon. As shown, the cushions 112 may extend along the entire width of the corresponding seat 104. The cushions 112 may either extend partially or to full height of the seats 104, as per the design requirements. The cushions 112 have been shown to have a generally rectangular cross-section, but, in other examples, the cushions 112 may have any other suitable cross-sectional shape without any limitations.

Further, as illustrated, the transporter 100 includes wheels 114 mounted beneath the base 102. In particular, the transporter 100 includes a first set of wheels 114a mounted near the front portion of the base 102 so as to be pivotally connected thereto by a front wheel assembly, and a second set of wheels 114b mounted near the rear portion of the base 102 and is non-pivotally connected thereto by a rear wheel assembly. Although, the transporter 100 has been described in terms of using four wheels; it may be understood that in other examples, the transporter 100 may have eight wheels, for example, the transporter 100 may utilize dual wheels on all four corners to make it less prone to fall into a crack or the like, without affecting the scope of the present disclosure.

Furthermore, as illustrated, the transporter 100 may include a steering column 116 which may be connected to the front wheel assembly in a traditional manner. In some examples, an accelerator (not shown) may be provided at the front portion, near the front seat 104a, in order to control speed and acceleration of the transporter 100. It may be understood that the accelerator may be in the form of throttle as conventionally known, and be implemented by providing more current to one or more electric motors (as discussed later in subsequent paragraphs) for accelerating the transporter 100 and vice-versa.

FIG. 2 illustrates a side planar view of the transporter 100, in accordance with one or more embodiments of the present disclosure. In an exemplary embodiment, the length 'L' of the base 102 may be about 92 inches, in which the front seat 104a may have a length 'S1' of about 16 inches and the middle seat 104b and the rear seat 104c may have lengths 'S2' of about 16-18 inches each. The overall heights 'H' of the seats 104 may be about 48 inches, and the height 'h' of the supporting bed 108 over the base 102 may be about 22 inches. Further, the seats 104 may be arranged on the base 102 with a gap of about 12 inches therebetween. In some examples, the seats 104 may have an open area (not shown) in backside thereof with height of about 12 inches to allow passenger sitting on seat behind thereof to comfortably accommodate legs. In one or more exemplary configurations, the base 102 may be supported at a height 'D' of about 8 inches from the ground. Further, the cross-section of the cushions 112, i.e. the length 'C1' and height 'C2' may both be about 8 inches.

In one or more examples, the frame of the seats 104 may be made of plastic materials. Further, the cushions 112 may be made of any of the suitable soft material which is waterproof, washable, durable and replaceable. In some examples, the supporting back 110 of the seats 104 may also be made of same soft materials as the cushions 112. Furthermore, the width (not shown) of the base 102 may be about 34 inches. It shall be understood that the given dimensions are exemplary only and shall not be construed as limiting to the present disclosure in any manner. In some examples, the transporter 100 may further include armrests (not shown) arranged along with the cushions 112 on the seats 104.

Referring now to FIG. 3, a bottom view of the transporter 100 is illustrated. As shown, the transporter 100 includes an undercarriage 118 supported on the base 102 by means of front bushings 122 and rear bushings 124. The undercarriage 118 may include side rails 120 which supports the various components therein. In one or more examples, the first set of wheels 114a are coupled by a manually controlled yoke for pivoting the first set of wheels 114a, and thereby steering the transporter 100. The first set of wheels 114a may be yoked together and permit manual steering of the transporter 100 through a steering linkage 126. It may be contemplated by a person skilled in the art that the steering linkage 126 may be coupled with the steering column 116 to allow for a driver to change direction of movement of the transporter 100.

The transporter 100 of the present invention is powered by a single, rechargeable battery 128 which is housed at the rear of the base 102. The rechargeable battery 128 may be a 12-volt DC battery and can be charged using a solar charger (not shown) installed in the transporter 100. The rechargeable battery 128, as shown, is conveniently positioned at the rearmost portion of the undercarriage 118 facilitating removal for recharging. In the illustrated configuration, the rechargeable battery 128 provides power to two electric motors 130 coupled to each wheel of the second set of wheels 114b. In one or more examples, the electric motors 130 may be DC powered, high torque motors. Using the electric motors 130, the motive/driving force may be applied to the second set of wheels 114b, via gearboxes (not shown), for providing movement to the transporter 100. It may be contemplated that although two motors 130 have been shown in the associated drawings, the transporter 100 may alternatively have a single motor coupled to both of the second set of wheels 114b without affecting the scope of the present disclosure.

In some embodiments, the transporter 100 may further include a covering (not shown) in the form of a canvas top, supported between the wall 106 at the front portion and the supporting back 110 at the rear portion. Such covering may protect the driver and passengers from rains, snowfall and the like. In some examples, the covering may be supported over four number of poles (not shown) arranged at corners in the front portion and the rear portion of the base 102. The covering may be arranged at a height of about 60 inches from the base 102, and allow adjustment to height up to 72 inches, with increments of about 4 inches using telescopic poles or the like, based on the needs of the user. The poles may further be configured to be snapped out of the base 102 and collapsible to be stored in pockets formed in the transporter 100, so that the covering may be removed when desired. In some examples, the transporter 100 may further include headlights and taillights encased in its frame, e.g. in the front portion and the rear portion of the base 102.

Further, in some embodiments, the transporter 100 may utilize self-driving technology, or some kind of driver robot, for driving thereof; thus providing further convenience to the users. Such self-driving technologies are well known in the art and thus have not been described herein for the brevity of the present disclosure. The transporter 100 is designed to be slim enough to drive straight through front living room doors and the like. The transporter 100 can be customized to include sidewalls along with doors for egress based on its application. The transporter 100 may generally be designed to have a weight capacity of about 700-900 pounds.

The transporter 100 may be utilized as a mobile wheelchair that seats two passengers and a driver with abundance of options, like two patients, or one patient and his/her caretaker, and the like. For example, in case of the transporter 100 application in hospitals, the patient may be picked up directly from parking garage or all the way from his/her home and delivered directly to their appointment area. The transporter 100 may fit through commercial elevators to traverse from one floor to another. In such application, the transporter 100 could be placed in waiting areas for use by persons with need thereof. The transporter 100 may also find applications in family resorts which are frequented by elderly population, airports, universities with large campus, shopping malls, and the like.

The transporter 100 of the present invention can be conveniently operated by a user, for example a driver sitting in the front seat 104a by means of the steering column 116. The transporter 100 being battery powered, which is rechargeable, and is optionally aided by a solar panel installed thereon for adding to and sustaining the energy of the battery, provide convenience to the user. Further, using various gearing arrangements between the electric motors 130 and the wheels 114, such as a low-speed forward gear for pavement and hard sand, a high-speed forward gear for soft sand, and a reverse gear for maneuverability, the transporter 100 can be operated on various types of terrains with ease. The transporter 100 of the present invention with large wheels 114 further aids to operate the transporter 100 on various types of terrains.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A self-propelled transporter, comprising:
   an undercarriage comprising:
      a first set of wheels pivotally connected at a bottom and proximal to a front of the undercarriage; and
      a second set of wheels non-pivotally connected at the bottom and proximal to a rear of the undercarriage;
   one or more electric motors coupled to the second set of wheels, said one or more electric motors being adjacent to said second set of wheels and parallel thereto, said one or more motors further being parallel to each other;
   a base having a base width, a front portion and a rear portion, said base supported on the undercarriage, said base having an upstanding peripheral wall extending therefrom at the front portion of said base, said base having an open space extending along said base width at an underside of said base at said front portion wherein said first set of wheels are visible therefrom said open space; and
   two or more seats installed on the base, wherein one of said two or more seats located near said front portion being a driver seat and remaining of said two or more seats being passenger seats, said two or more seats each having a seat width that extends to lateral edges of said base until said two or more seats are flush with said lateral edges, said base width and said seat width being the same, said two or more seats having a supporting bed for seating thereon and a supporting back being integral to said supporting bed and extending orthogonally from said supporting bed, one of said passenger seats mounted on said rear portion being flush therewith said rear portion, said two or more seats having a height greater than that of said upstanding peripheral wall.

2. The transporter of claim 1, wherein the two or more seats comprise three seats arranged in line on the base.

3. The transporter of claim 1, wherein the first set of wheels are yoked together by a steering linkage.

4. The transporter of claim 3 further comprising a steering column centrally located at the front portion of the base, wherein the steering column is connected to the steering linkage to allow manual steering of the transporter.

5. The transporter of claim 1, wherein the one or more electric motors comprise two electric motors, a respective electric motor coupled to each wheel of the second set of wheels.

6. The transporter of claim 1, wherein the one or more electric motors are direct-current based high torque motors.

7. The transporter of claim 1 further comprising a rechargeable battery arranged at the rear portion of the base and entirely underneath said base, wherein the battery provides electric power to the one or more electric motors.

8. The transporter of claim 1, wherein the base is mounted on the undercarriage using one or more bushings.

9. The transporter of claim 1, wherein the base is rectangular in shape.

10. The transporter of claim 8, wherein said one or more bushing are further defined as front bushings and rear bushings.

11. The transporter of claim 10, wherein said one or more motors extend rearwardly as far as said rear bushings extend.

12. The transporter of claim 1, wherein said passenger seats include cushions which extend to and are flush with seat lateral edges, said cushions extending entirely along said seat width, a predetermined distance along a length of said supporting bed and a predetermined distance along a height of said supporting back.

13. The transporter of claim 1, wherein said transporter is entirely open on all sides of the base and from above.

* * * * *